United States Patent [19]

Eliot

[11] Patent Number: 4,479,571
[45] Date of Patent: Oct. 30, 1984

[54] PROTECTIVE GLOVE SYSTEM

[76] Inventor: Sigdon A. Eliot, c/o Columbus Forge & Iron Co., 544 West First St., Columbus, Ohio 43215

[21] Appl. No.: 323,526

[22] Filed: Nov. 23, 1981

[51] Int. Cl.³ ............................................... F16P 3/06
[52] U.S. Cl. ............................ 192/129 A; 192/131 R; 192/134
[58] Field of Search ............... 192/129 A, 131 R, 134, 192/135; 100/53; 2/161 R; 312/1

[56] References Cited

U.S. PATENT DOCUMENTS

| | | | |
|---|---|---|---|
| 2,741,410 | 4/1956 | Violette | 312/1 |
| 3,806,952 | 4/1974 | Viciulis | 312/1 |
| 3,858,418 | 1/1975 | Butler | 312/1 |
| 4,195,722 | 4/1980 | Anderson et al. | 192/131 R |
| 4,220,032 | 9/1980 | Smith, Jr. | 192/134 |
| 4,228,935 | 10/1980 | Madray | 2/161 R |
| 4,321,841 | 3/1982 | Felix | 192/131 R |

Primary Examiner—Rodney H. Bonck
Assistant Examiner—James J. Merek
Attorney, Agent, or Firm—Biebel, French & Nauman

[57] ABSTRACT

A guard for protecting the hand or hands of an operator to limit the extension thereof and prevent entry into a hazardous or danger zone of a machine, such as a stamping press or the like, includes a shield in the form of a transparent or partially transparent rigid plate member which is fixed in spaced relation to the throat or nip point or hazardous region of the press. The plate has an aperture through which the operator may extend a portion of a protective glove in loading and unloading articles into and out of the hazardous region. The glove has a rigid, radially extending cuff or collar surrounding the glove at the wrist portion and having an outer dimension which exceeds that of the aperture formed in the plate. The position of the collar on the glove is related to the position of the plate and the maximum extension of the fingers such that when the glove is inserted through the opening, no part of the hand may enter a predetermined danger zone. The guard plate has a certain degree of lateral and vertical movement in the plane of the plate. A modified form of plate provides a pair of transversely spaced access openings connected by a slot for use with a machine in which elongated work pieces need to be loaded with both hands. A flap normally covers the slot and operates an interlock switch which prevents operation of the machine except when the flap is closed.

6 Claims, 9 Drawing Figures

U.S. Patent   Oct. 30, 1984   Sheet 1 of 2   4,479,571
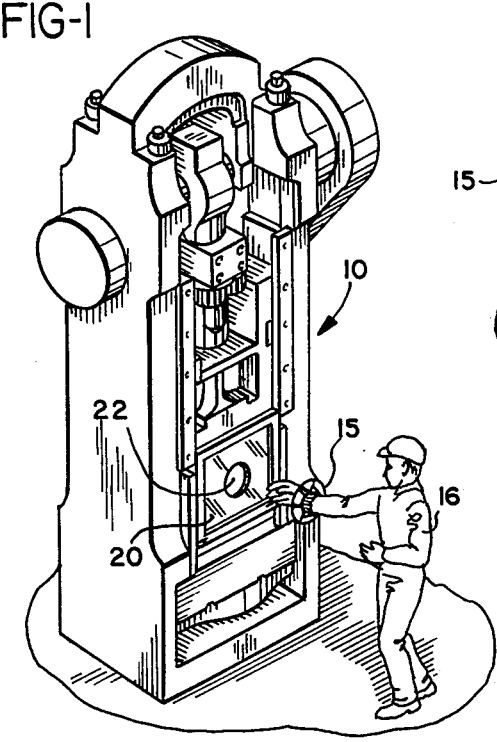
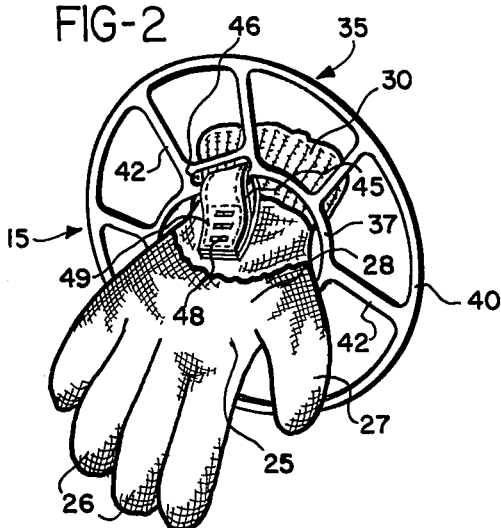
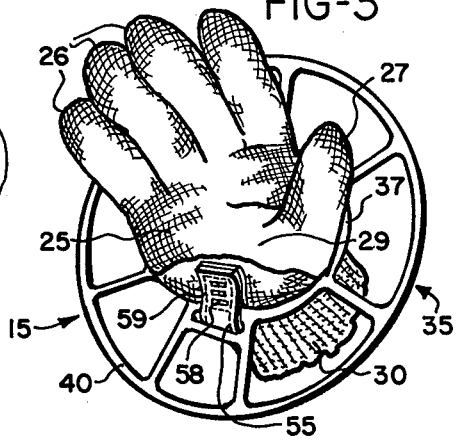
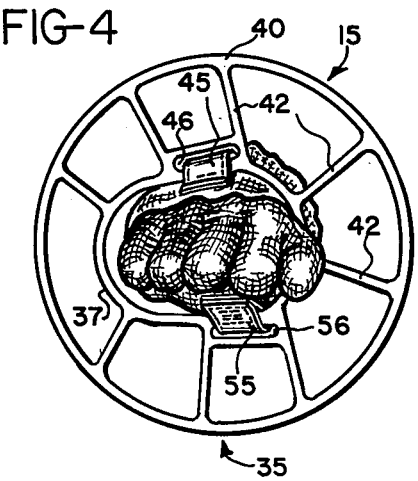
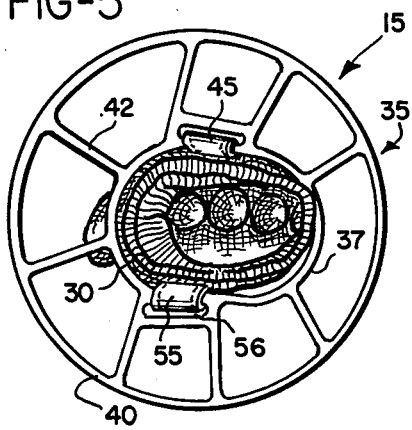

PROTECTIVE GLOVE SYSTEM

BACKGROUND OF THE INVENTION

This invention relates to personnel protection devices and more particularly to apparatus for protecting the hands of the operator of machinery, such as presses, which have a defined danger zone or region, such as between the platens or dies of a punch press, a forging press, a cutting shear or the like or moving components sometimes referred to as a nip point. The invention further includes, as an important part of the combination, a standard or specially configured glove with a guard formed or attached thereon in defined relation to the tip or extremities of the glove.

There is a need for positive hand protection devices for operators of certain kinds of machinery, such as presses or the like. Such protection devices, however, must be easy and comfortable to use, and should not unduly restrict the movements of the operator, but should have a positive effect of preventing the insertion of a hand extremity into a predetermined danger zone. Additionally, the hand protection device must not unduly obstruct the view of an operator from performing and observing the task, and must be one which cannot inadvertently or easily be defeated.

SUMMARY OF THE INVENTION

The invention is directed to protection apparatus which is particularly useful in guarding the hands of an operator of a machine, such as a cold trim press, a stamping press or the like. The apparatus particularly includes a glove which operates, in combination with a guard plate to limit the extension of a hand carried within the glove and prevent entry thereof into a predetermined hazardous region. The glove is provided with an essentially rigid annular cuff or collar which surrounds the glove adjacent an inner portion of the glove. The collar is preferably adjacent the wearer's wrist, and extends radially therefrom. It is provided with an inner portion which is rigidly or fixedly attached to the material of the glove at a defined location in relation to the maximum extended portion of any finger or tip of the glove, and secured to the fabric of the glove in at least two locations, preferably a location at or near the back of the hand and a second location at or near the palm of the hand, so that the collar is stabilized in a medium plane transverse to the major or lengthwise axis of the glove. For example, the collar may be formed as a lightweight casting or stamping, or formed of plastic, with an inner portion close to or adjacent the glove in surrounding relation, which inner portion is attached to the material of the glove as defined above, and a radially outer portion which may be essentially circular in form.

The apparatus of this invention further includes means for engaging the glove collar in the form of a plate member which is positioned or held, preferably in a frame on the machine, e.g. a press, in fixed and spaced relation to the hazardous region from which the hand is to be protected. The plate member may, preferably, take the form of a transparent plastic plate, such as one formed of Lucite TM, or may be formed of essentially rigid and heavy screening material, through which the operator may relatively easily view the work station, for the insertion or removal of workpieces therefrom. The plate is provided with an opening having a diameter sufficient to receive the forward portion of the glove with the hand therein, but having a dimension substantially less than the outer radial dimension of the collar on the glove, so that the collar may not pass therethrough. Shapes other than round may be employed provided that the plane of the collar cannot pass through the plane of the opening.

Preferably, the plate is mounted for limited transverse movement in its plane to permit the operator to have some aligning movement for ease of inserting or removing the workpiece or the part, from the press. Further, limited movement permits a gloved hand to move with a part in the event that the glove itself should become snagged on a misaligned workpiece as it may move around abnormally when the press descends.

A mounting frame for the plate member provides means by which the plate member may be positioned in selected spaced relation from the danger or hazardous region and then substantially permanently locked in such position.

In a further embodiment of the invention, particularly adapted for use on larger presses, for example in stamping automobile bumper parts or the like, a wide plate is employed which is formed with two spaced apart holes through which both protected gloved hands may be inserted. A horizontal connecting slot or opening is formed between the holes, extending into the sides of the holes and covered or closed by a hinged flap. The flap is preferably weighted or spring urged to close the elongated center opening.

A detector switch or switches, such as a normally open reed switch or the like, which closes only when the flap is closed, may be used in a circuit where the foot control or foot pedal cannot engage the press drive clutch unless and until the flap is in its closed position as indicated by the closure of the switch. Such an arrangement has the advantage of leaving the operator free to retain his hands, within the protective gloves, in the general vicinity of the part being stamped, and can eliminate the necessity of withdrawing the operator's hands to operate a conventional two-hand control. The hands will be protected by the gloves and cuff guards or collars on the gloves in combination with the rigid plate, allowing for foot control of the press, leaving the operator free to retain his hands in a "ready" position during the actual pressing operation. This eliminates the necessity of retracting his hands entirely from the press and reaching out to operate a conventional pair of hand control buttons, and then having to bring the hands back again into the press region for removing the part.

It is accordingly an object of this invention to provide an easy to use, hand protective device for presses or the like including a glove element with an essentially rigid protector barrier, collar or cuff formed thereon in combination with an essentially rigid plate or the like having an aperture therein for receiving the forward portion of a gloved hand in the glove and for engaging the cuff to prevent further insertion and to limit the extension of the wearer's fingers into a danger zone.

A further object of the invention is the provision of a protective glove, of the kind outlined above.

A still further object of the invention is the provision of glove and plate apparatus for two-handed loading and unloading of a press, forming a positive barrier, while provided with a press control flap or the like to signal the complete insertion or removal of a workpiece and place the press in a ready position so that the same may be operated by a foot control while protecting the hand extremities and permitting the same to remain in position to remove the workpiece.

These and other objects and advantages of the invention will be apparent from the following description, the accompanying drawings, and the appended claims.

BRIEF DESCRIPTION OF THE DRAWINGS

FIG. 1 is a perspective view 1 of a press to which has been applied the apparatus of this invention;

FIG. 2 is a perspective front view of the protective glove portion of the invention, looking down somewhat on the top or back portion of the glove;

FIG. 3 is a perspective front view of the glove of the invention but looking somewhat upwardly toward the palm of the glove;

FIG. 4 is a front elevational view of the glove portion of the invention;

FIG. 5 is a rear elevational view of the glove portion of the invention;

DESCRIPTION OF PREFERRED EMBODIMENTS

Figure 6:
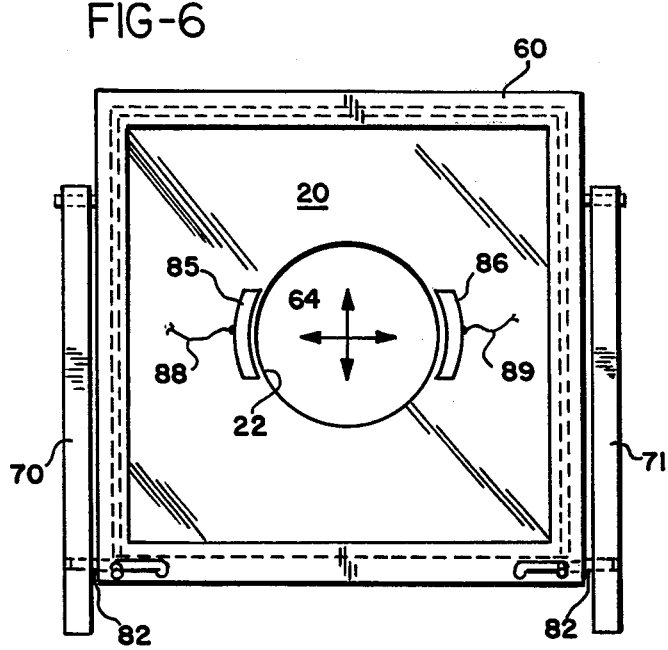
FIG. 6 is an elevational view of the plate or shield and showing the mounting frame therefor.

Referring to the figures of the drawing which illustrate preferred embodiments of the invention, the shield of the present invention is shown as being applied to a stamping press illustrated generally at 10 in FIG. 1. It is understood that the press 10 may be any form of industrial forming, cutting, shearing or stamping machinery, or the like, which has an inherently dangerous zone or nip point within which a workpiece is to be inserted or removed for forming, cutting, shearing, punching, or preforming some other operation on the workpiece. Such operations require apparatus for assuring that the operator's hands are free and clear of the danger zone before the machine may be operated.

An important element of the present invention comprises a protective glove which is illustrated generally at 15 in FIGS. 1 and 2 which may be worn on the hand of the operator 16 during the insertion and removal of the workpiece. The invention further includes an essentially rigid, transparent or partially transparent guard plate illustrated generally at 20 formed with an aperture 22 therethrough. The plate 20, as will be described below in further detail, is adjusted and then fixed in relation to the throat or the hazardous region of the press 10 and is spaced therefrom. The aperture 22 provides a means by which the operator may extend a portion of the glove 15 in loading and unloading articles into and out of the hazardous region. Preferably, the plate 20 is mounted in a frame providing for limited lateral movement, such as limited vertical or horizontal movement essentially in the plane of the plate, to provide adjustment to workpiece location in the machine for the protective device to function and to permit ease of insertion and removal of complicated parts.

The glove 15 is illustrated in greater detail in FIGS. 2-5. The glove itself may be formed of a heavy material such as canvas or leather, flexible but not stretchable, and includes a body 25 forming the conventional glove fingers 26 and thumb 27. While a right-hand glove is illustrated, the invention may readily by applied to a left-hand glove as well. The glove body has a back 28 and a palm 29, and may be provided with a soft cuff 30 extending from the wrist portion of the glove.

The glove 15 is provided with a rigid generally radially extending annular collar 35 essentially fixedly mounted to the glove at defined locations. For this purpose, the collar 35 is preferably formed of relatively lightweight yet strong and essentially rigid material, such as a high impact plastic, cast aluminum or the like, and is illustrated in FIGS. 2-5 as having a radially inner portion 37, annular in configuration, received in surrounding relation to the glove inwardly of the fingers and thumb and approximately along a median plane extending through the wrist portion. The radially inner portion is connected to an annular outer guard portion 40 of the collar by means of a plurality of radially extending connecting webs 42 or alternatively constructed with holes which are for the purpose of reducing weight or visibility.

Means for permanently securing and mounting the collar 35 onto the material or fabric of the glove preferably includes a first heavy duty loop 45 of fabric or leather received on the collar through a loop-receiving aperture 46, with the terminal ends brought together about the inner portion 37 with the forward ends stitched as well as stapled to the glove at the back 28 thereof, as indicated by the staples 48 and stitching 49. Additionally, the loop 45 may be glued at its ends to aid in securing the loop in a permanently closed position with the guard ring 35 captured therein. A second essentially similarly configured loop 55 is received through a second loop-receiving aperture 56 of the guard ring and secured by staples 58 and stitching 59 to a palm 29 of the glove 15. Other methods of attachment such as direct stapling, crimping or pinning may be employed provided they effectively limit the extension of the fingers in relationship to the plane of the collar.

It is preferable that the collar 35 be stabilized with respect to the glove and attached in at least two locations as defined by the loops 45 and 55. The outer diameter of the ring 35 substantially exceeds the maximum diameter of the aperture 22 so that when the operator reaches into the press toward the danger zone, the maximum extension of the wearer's fingers in the glove is limited to a predetermined position forward of the collar 35, as defined by the location of the collar 35 on the glove and by the location of the essentially rigid shield or panel 20.

The collar 35, while formed of rigid material, is webbed as indicated by the preferred employment of an inner annular portion 37 connected to an outer ring or annular portion 40 by means of interconnecting or radially extending webs or spokes 42, to provide a lightweight structure, forming an essential part of the wearing appliance defining the protective glove, which is light in weight, does not unduly obstruct or resist the operator's natural movements, and is not a physical burden. By stabilizing the location of the protective cuff 35 with respect to the body 25 of the glove 15, the operator is physically prevented from extending any portion of a finger into a hazardous region of the press 10, even in the event that the glove 15 is inserted through the aperture 22 at an angle. Preferably, the cuff 35 is attached to the body 25 of the glove 15 in a jig so that the distance from the tips of the fingers to the front side of the collar which engages the plate 20 may be accurately controlled.

The apparatus of the present invention further includes a guard shield as in the form of the essentially transparent plate shown in FIG. 6 as being mounted in an encircling frame 60. Plate 20 may be formed of rigid transparent material, such as plastic. In certain instances it may be desirable to replace a plastic plate 20 with essentially rigid or heavy wire, open mesh plate contained or formed with the aperture 22, with the mesh providing the desired transparency.

The plate 20 is formed somewhat larger than the inside dimensions of the encircling rectangular frame 60, but less than its outer dimensions, thus providing for limited translatory movement of the plate 20 essentially in its plane, either vertically or horizontally as illustrated by the arrows 64. The ability to position, locate, or move the plate 20 within the frame 60 permits the operator some freedom of motion in inserting and withdrawing parts from the danger zone, and also allows some movement in the event that a part or workpiece is improperly positioned, or engages or catches on the glove. It may be automatically brought back to its starting position by means of springs.

Figure 7:
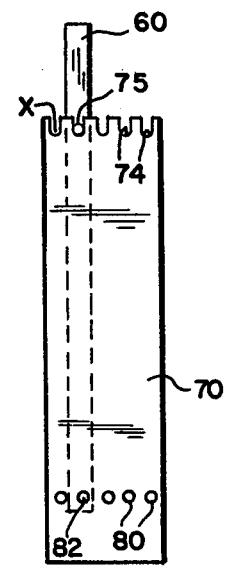
FIG. 7 is a side elevational view of the shield and frame.

One means for mounting the plate 20 in a predetermined spaced relationship to a hazardous zone includes a pair of side mounting frame members 70 and 71 which are fixed in relation to the press. The side frame members 70 and 71 are essentially identical in construction, and the frame 70 is illustrated in FIG. 7 as including a plurality of pin-receiving notches 74 formed along an upper surface thereof for receiving a transversely extending pin 75 carried on the frame 60. The lower portion of the side frame 70 is provided with a corresponding plurality of apertures 80, to receive a transversely extendable pin 82 carried on a lower portion of the frame 60. The upper transverse pins 75 and lower retractable and outwardly extendng pins 82 are moved into corresponding pairs of grooves 74 and apertures 80, rigidly positioning the frame 60 and the supported plate 20 therein in a fixed but spaced relationship to a hazardous zone of the press.

In the event that the press may be accessible to personnel who are not wearing the glove/collar, it may be desirable to guard further against insertion of an ungloved hand through the aperture 22. This is accomplished by mounting electrical contacts 85, 86 spaced around the aperture and (in the case of a metallic plate) electrically insulated from the remainder of the press and guard shield. The collar 35, if formed of electrically conductive metal, or if not, by having an electrical connector extending to opposite sides of the collar, will then function as a detector which will complete a safety circuit via conductors 88, 89. This circuit, in a conventional way, may be included in a press control circuit in such fashion as to prevent operation of the press unless there is a completed circuit through conductors 88 and 89.

Figure 8:
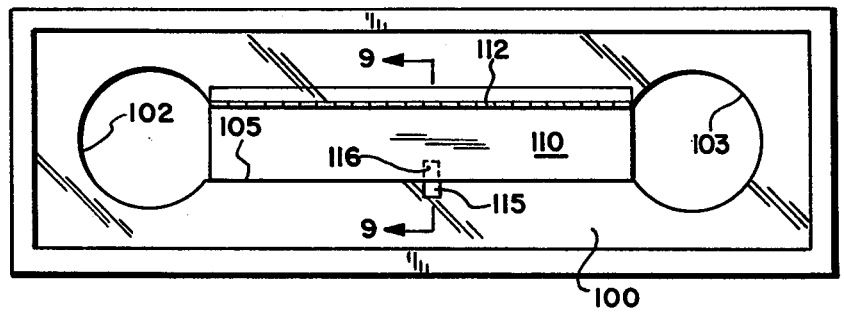
FIG. 8 is a front elevation of a modified form of a shield for two-handed operation.

In some instances, it is desirable to load and unload parts from a press by use of both hands. This could be particularly useful in certain kinds of punching or shearing operations, or stamping operations, where the parts to be located are more conveniently handled in a two-handed operation. For this purpose, right and left-hand versions of the glove 15 are provided in accordance with the above teachings and in accordance with FIGS. 2 through 5. A modified guard plate is illustrated generally at 100 in FIG. 8 including a pair of transversely spaced glove-receiving apertures 102 and 103 interconnected by a transverse slot 105 through which the workpiece may be inserted or removed. The openings 102 and 103 of the plate 100 are formed with the same relationship to the cuff 35 as is the opening 22 in the plate 20.

Figure 9:
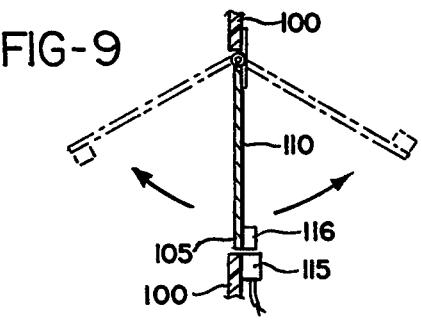
FIG. 9 is a fragmentary transverse section through the shield of FIG. 8 showing the operation of a central control flap.

Means for indicating the presence of a workpiece within the slot 105 of the plate 100 and provided with means for preventing the operation of the press when such workpiece is within the slot, may include a flap 110 connected by a suitable piano hinge 112 or the like along the upper margin of the slot 105 and depending into the slot. The flap 110 is shown in FIG. 9 as being deflectable in either an inward or outward movement depending on whether a workpiece is being inserted or withdrawn.

Means for detecting the normal fully closed or rest position of the flap showing that the workpiece is not in transit, may consist of a magnetically operated reed switch or relay 115 sensing the presence of a magnet 116 carried on the flap. The switch 115 may conventionally be incorporated in a control circuit for the press requiring the same to be operated or closed, signalling a "ready" condition, before the press may be operated. In this manner, an operator may leave his hands, as protected by the gloves 15, in the general vicinity of the part being stamped, and the press operated by a conventional foot control or the like, as opposed to the conventional two-handed control which requires that the operator reach out and/or down to close separate switches.

The gloves 15 incorporating the cuff guards 35 in combination with the rigid plate 100, protect the operator's hands while permitting the operator to retain his hands in a ready position so that after the part is loaded, and the flap 110 moves to its normal or closed positions, he may leave his hands essentially in place, and when the press retracts, he can readily reach in, remove the part, thus eliminating the time delay and expended energy which would otherwise be required in fully retreating from the press and reaching both hands to operate the interlock or safety buttons, and then bringing the hands back toward the operating region of the press. As described it is evident that the flap need not necessarily be co-planer with the glove aperature, and further it may be notched or otherwise specially shaped provided that there is no access to danger with the switch in the "ready" condition. Also safety detector circuits (such as shown in FIG. 6 and previously described) can be added to apertures 102 and 103, together with the associated gloves, if this additional feature is desired.

The operation of the embodiments of this invention are believed to be essentially self-evident from the foregoing description. A glove is chosen for the operator which is comfortable to wear, while providing the required abrasion resistance and other hand protection qualities required. An essentially rigid annular cuff 35 is affixed and attached to the glove at at least two locations in predetermined relation to the maximum extension of the fingers 22 and the thumb 27, and is secured thereto. Preferably this is at a plane approximately through the wearer's wrist, and the securing means comprising the closed and sewn and stapled loops 45 and 55 are secured at the back and at the inside palm of the hand sufficiently close to the wrist so as not to obstruct or interfere with the normal use of the glove itself. As noted above, the guard cuff 35 has a diameter which exceeds the opening 22 or 102, 103 in the guard plate, but yet is light in weight so as to be relatively unobstrusive and non-fatiguing.

The guard plate itself may be formed of any suitable transparent yet rigid protective material, although semi-transparent materials, such as reinforced wire mesh or screen, may be used. Preferably the plate 20 is provided with some limited movement in its plane, for the purpose noted above, and may be mounted in a frame 60 and supported by rigidly mounted side members 70 in any one of a plurality of positions which are predetermined, in relation to the cuff 35, to prevent any possible extension of the wearer's fingers into a hazardous region.

While the forms of apparatus herein described constitute preferred embodiments of this invention, it is to be understood that the invention is not limited to these precise forms of apparatus, and that changes may be made therein without departing from the scope of the invention.

What is claimed is:

1. An item of protective apparel for use with press machinery or the like having a hazardous region of operation which is accessed through an aperture of limited extent, said aperture being in fixed space relation to said hazardous region, said protective apparel limiting the extension of a hand therein from entry into said hazardous region and comprising:
    means defining an annular essentially rigid collar surrounding an inner portion of said protective apparel adjacent the wearer's wrist,
    said collar having a radially inner encircling portion thereof fixed to said protective apparel and stabilized with respect to said protective apparel, and having a radially outer encircling portion,
    said collar forming an abutment which cannot pass through said aperture and is relatively fixed in relation to a transverse plane through said protective apparel to limit the extension of the wearer's fingers to a predetermined maximum position forward of said collar and outside of said hazardous region.

2. A protective glove for use with press machinery or the like having a hazardous region of operation which is accessed through an aperture of limited extent, said aperture being in fixed space relation to said hazardous region, said protective glove limiting the extension of a hand therein from entry into said hazardous region and comprising:
    means defining an annular essentially rigid collar surrounding an inner portion of said glove adjacent the wearer's wrist,
    said collar having a radially inner portion thereof fixed to said glove at at least two locations on opposite sides of the wrist for stabilizing said collar with respect to said glove, and having a radially outer portion,
    said collar forming an abutment which cannot pass through said aperture and is relatively fixed in relation to a transverse plane through said glove to limit the extension of the wearer's fingers to a predetermined position forward of said collar and outside of said hazardous region.

3. A shield for a press or the like comprising:
    transparent plate means fixed in spaced relation to a hazardous region of said press,
    means in said plate means defining an aperture,
    a protective glove adapted to be worn by an operator for gripping and loading work pieces into said press and for removing the same therefrom through said aperture,
    said glove having means thereon defining a relatively rigid radially extending collar having an outer dimension which exceeds that of said aperture, and mounted on said glove in predetermined relation with respect to the maximum extent of finger extension thereof, whereby the operator may insert and withdraw parts from said hazardous region through said aperture using said glove, with the engagement of said collar with said plate means preventing insertion of any portion of a hand within said glove into said hazardous region.

4. The shield of claim 3 in which said plate means comprises a transparent barrier plate movable to a limited extent in its plane.

5. The shield of claims 3 or 4, including a safety circuit comprising fixed electrical contacts on opposite sides of said aperture and an electrical contact means on said collar adapted to engage said fixed electrical contacts for completing a circuit when said glove is inserted into said aperture.

6. In combination, a shield for a press or the like providing for two-hand operation of the loading and unloading of workpieces from the press comprising:
    a plate which is fixed in relation to a hazardous region of the press and spaced therefrom,
    said plate being transversely elongated and having means therein defining a pair of transversely spaced glove-receiving apertures connected by an elongated transverse slot opening into said apertures,
    said apertures being proportioned each to receive the forward portion of a protective glove having rigidly attached thereto a generally radially extending collar limiting the extent of insertion of said glove into said apertures, and
    flap means associated with said slot movable between a closed position normally across said slot to an open deflected position having switch means thereon, said switch means being responsive to the movement of said flap in said closed position signalling the complete insertion of a workpiece therethrough and enabling the operation of the press.

* * * * *